April 12, 1949.  P. N. FRADE  2,466,886
ARC WELDING TOOL
Filed May 6, 1946
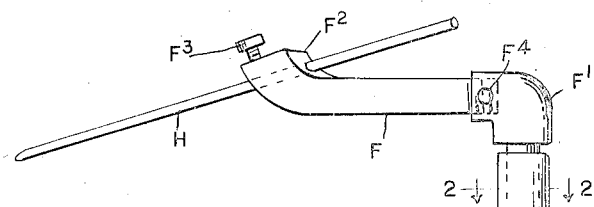
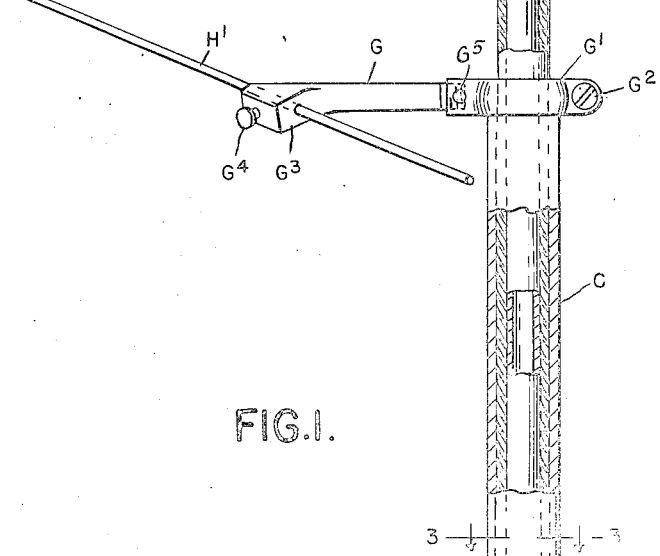
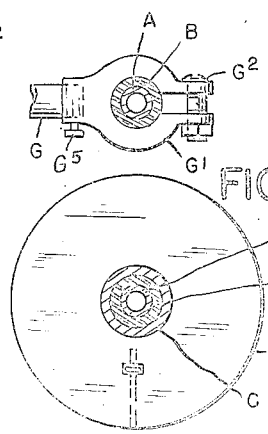
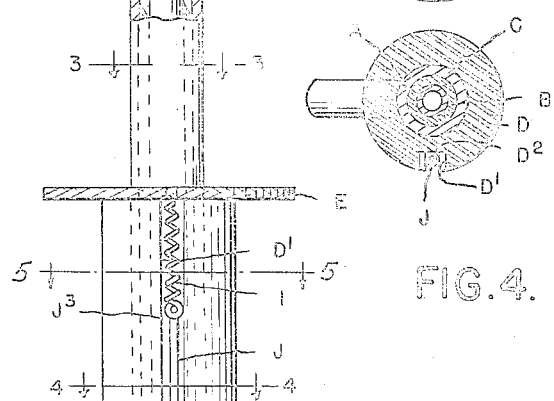
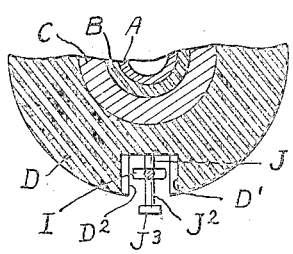
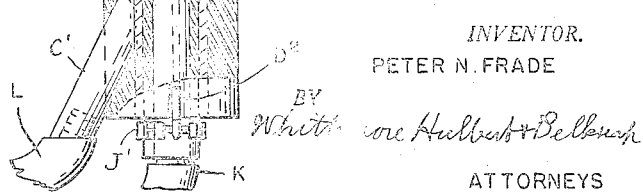
*INVENTOR.*
PETER N. FRADE
ATTORNEYS Patented Apr. 12, 1949

2,466,886

UNITED STATES PATENT OFFICE 2,466,886

ARC WELDING TOOL

Peter N. Frade, Detroit, Mich., assignor to C. E. Phillips & Company, Detroit, Mich., a corporation of Michigan Application May 6, 1946, Serial No. 667,569

6 Claims. (Cl. 219—14)

The invention relates to welding apparatus and has for its object the obtaining of a tool for use in carbon flame electric arc welding, which can be conveniently manipulated for the performance of its work.

It is a further object to obtain a simple construction which is formed to a large extent as an assembly of telescopically engaged standard metallic and fiber tubings. To this end the invention consists in the construction as hereinafter set forth.

In the drawings:

Fig. 1 is an elevation of the tool having portions broken away to show the interior construction;

Figs. 2, 3 and 4 are cross sections respectively on lines 2—2, 3—3, 4—4, Fig. 1;

Fig. 5 is a cross section on line 5—5, Fig. 1.

With certain types of welding apparatus as, for instance, the acetylene torch, the flame is projected from a tool which can be conveniently manipulated by one hand of the operator. On the other hand, with carbon flame electric arc welding, it is necessary to first contact the electrodes and then to separate them to form the arc flame. My improved tool is one in which this contacting and separation of the electrodes can be easily performed by the same hand which holds and guides the tool which leaves the other hand of the operator free. The tool is formed chiefly of standard tubing which may be obtained in sizes that can be telescopically engaged with each other. Certain tubular elements are metallic for conducting the current to the electrodes, while other tubular elements are insulators being preferably formed of fiber tubing.

More in detail, A is an inner element preferably formed of copper tubing of small diameter such, for instance, as one-quarter inch. B is an insulator fiber tube surrounding the tubular element A and covering all but the outer end portion thereof. C is another metallic tube preferably of steel surrounding the fiber tube B to slidably engage the same and being of a length somewhat less than that of the tubes A and B. D is a fiber tube surrounding the inner end portion of the tube C and forming a handle for manipulating the tool. A disc-shaped member E is arranged adjacent to the outer end of the handle D to form a guard therefor. Secured to the outer ends respectively of the metallic tubes A and C are laterally extending arms F and G forming electrode holders. The arm F is connected by an elbow F' with the threaded outer end of the member A and the arm G is connected by a split clamp G' to the outer end of the steel tube C. A screw $G^2$ constitutes the clamping means. The arm F has at its outer end an obliquely inclined apertured portion $F^2$ through which a carbon electrode H is inserted and is clamped by a set screw $F^3$. In the same manner the arm G has an oblique portion $G^3$ for receiving a carbon electrode H' which is clamped by a set screw $G^4$. The handle D is provided with a groove D' for receiving a spring I, one end of which is anchored to the disc E while the opposite end is attached to a rod J passing through a narrower groove $D^2$ to the inner end of the handle. Here it is attached by a loop J' to the projecting end of the fiber tube B which surrounds and is attached to the tube A. The spring I is attached to the rod J by a laterally extending hook $J^2$ thereon and a knob $J^3$ is secured to the outer end of said hook and outside of the groove D'. The arrangement is such that normally the tension of the spring I will draw the rod J and tube A against the handle D thereby separating the arms F and G and electrodes H and H' from each other. The tubes A and C are electrified by cable connections thereto respectively K and L, the former being directly attached to the end of the tube A and the latter through the medium of an inclined tube C' passing through the handle D and welded or otherwise secured to the tube C.

With the construction as described in the normal position of the parts the electrodes H and H' are separate from each other so that no current can pass therebetween. However, the operator grasping the handle D can use his thumb for operating the knob $J^3$ to move the rod J counter to the direction in which it is urged by the tension of the spring I. This will move the arm F towards the arm G until the ends of the electrodes H and H' come into contact. As soon as this occurs the operator permits the electrodes to separate by somewhat releasing the pressure on the knob $J^3$ thereby forming an arc or carbon flame between the electrodes. The length of the arc is also governed by pressure on the knob $J^3$ which correspondingly increases or diminishes the resistance and the amount of heat generated. There is also provision for changing the angle of the electrodes H and H' with respect to each other. This is accomplished by slightly rotating the arms F and G with respect to the elbow F' and clamp G' and set screws $F^4$ and $G^5$ hold them in adjusted positions. Thus, the construction is one which is comparatively simple and inexpensive to manufacture and which forms a very convenient instrument for use in carbon flame welding.

What I claim as my invention is:

1. A tool for use in carbon flame electric welding comprising telescopically and concentrically engaged conductors having an insulator tube therebetween, holders for carbon electrodes extending laterally from one end of each of said conductors, a handle secured to the opposite end of one of said conductors, flexible electric connections to said conductors adjacent to said handle, resilient means for urging said conductors in a direction to separate said electrodes from each other, and means operable by the hand grasping said handle for relatively moving said conductors to contact said electrodes.

2. A tool for use in carbon flame electric welding comprising an electrical conductor, an insulator tube surrounding said conductor for the greater portion of the length thereof, a conductor tube surrounding and telescopically engaging said insulator tube, holders for carbon electrodes extending laterally from one end of each of said conductors, an insulator tube surrounding said conductor tube at the opposite end thereof and forming a handle all of said tubes being coaxial, flexible electric connections to said conductors adjacent to said handle, a member mounted on said handle and connected to the insulator tube surrounding said first mentioned conductor, said member being operable by the hand grasping said handle to move said electrodes in contact with each other, and resilient means for urging said first mentioned conductor in a direction relative to said handle for separating said electrodes.

3. A tool for use in carbon flame electric welding comprising an electrical conductor, an insulator tube surrounding said conductor for the greater portion of the length thereof, a conductor tube surrounding and telescopically engaging said insulator tube, arms extending laterally from said conductors each having at its outer end a holder for a carbon electrode extending at an oblique angle to said arm, an insulator tube surrounding said conductor tube at the opposite end thereof and forming a handle all of said tubes being coaxial, flexible electric connections to said conductors adjacent to said handle, a member mounted on said handle and connected to the insulator tube surrounding said first mentioned conductor, said member being operable by the hand grasping said handle to move said electrodes in contact with each other, resilient means for urging said first mentioned conductor in a direction relative to said handle for separating said electrodes, and means for rotating said arms to change the angular relation of said electrodes with respect to each other.

4. A tool for use in carbon flame electric welding comprising an electrical conductor, an insulator tube surrounding said conductor for the greater portion of the length thereof, a conductor tube surrounding and telescopically engaging said insulator tube, electrode holders extending laterally from one end of each of said conductors, carbon electrodes in said holders, an insulator tube surrounding said conductor tube at the opposite end thereof and forming a handle, flexible electric connections to said conductors adjacent to said handle, a member mounted in a groove in said handle and having an insulated connection to the inner conductor, a knob projecting from said member operable by the thumb of the hand grasping said handle to move said electrodes in contact with each other, and resilient means for urging said inner conductor in a direction for separating said electrodes.

5. A tool for use in carbon flame electric welding comprising a series of tubes formed from standard tubing successively in telescopic relation, said tubes being alternately of conductive and insulating material, electrode holders connected to and extending laterally from the conductive tubes at one end thereof, carbon electrodes in said holders, flexible electric connections to the ends of the conductor tubes opposite to said electrodes, a handle formed by the outermost of said insulator tubes which surrounds all other tubes said handle being adjacent to said electrical connections, a member slidable in a groove in said handle and having an insulated connection with the inner conductor tube, a spring connected to said member within said handle for actuating said inner conductor in a direction to separate said electrodes, and a knob projecting from said member adapted to be actuated by the thumb of the hand grasping said handle to move said electrodes in contact with each other.

6. A tool for use in electric welding comprising telescopically engaged coaxial conductors having a concentric insulator tube therebetween, an arm extending laterally from one end of each conductor provided at its outer end with a holder for an electrode extending at an oblique angle to said arm, a handle secured to the opposite end of one of said conductors, flexible electric connections to said conductors adjacent to said handle, resilient means for urging said conductors in a direction to separate said electrodes from each other, means operable by the hand grasping said handle for relatively moving said conductors to contact said electrodes, and means for rotatably adjusting said holders about the axes of their respective arms to change the angle of said electrodes with respect to each other.

PETER N. FRADE.

REFERENCES CITED

The following references are of record in the file of this patent:

UNITED STATES PATENTS

| Number | Name | Date |
| --- | --- | --- |
| 2,253,994 | Barclift | Aug. 26, 1941 |
| 2,274,157 | Nielsen | Feb. 24, 1942 |